US00RE37155E

(19) United States
(12) Reissued Patent
Andersen

(10) Patent Number: US RE37,155 E
(45) Date of Reissued Patent: May 1, 2001

(54) RESTRAINING AND PROTECTION DEVICE FOR NECKSTRAP-SUSPENDED EQUIPMENT

(76) Inventor: M. Dan Andersen, 404 S. 300 East, Brigham City, UT (US) 84302

(21) Appl. No.: 08/663,527

(22) Filed: Jun. 13, 1996

Related U.S. Patent Documents

Reissue of:
(64) Patent No.: 5,320,261
Issued: Jun. 14, 1994
Appl. No.: 08/005,578
Filed: Jan. 19, 1993

(51) Int. Cl.[7] ..... A45F 5/02
(52) U.S. Cl. ..... 224/194; 224/666; 224/676; 224/269; 224/909
(58) Field of Search ..... 224/908, 909, 224/660, 663, 664, 676, 666, 194, 242, 269

(56) References Cited

U.S. PATENT DOCUMENTS

| | | | | |
|---|---|---|---|---|
| 367,996 | * | 8/1887 | Nathan | 224/663 X |
| 1,479,008 | | 1/1924 | Powers | 224/269 X |
| 1,618,088 | | 2/1927 | Hinrichs . | |
| 1,827,524 | | 10/1931 | Hilburger . | |
| 2,574,143 | | 9/1951 | Colby | 224/1 |
| 2,990,039 | | 6/1961 | Nystrom | 224/5 |
| 3,152,738 | | 10/1964 | Worsfold, Jr. | 224/5 |
| 3,209,968 | | 10/1965 | Flanagan | 224/6 |
| 3,258,182 | | 6/1966 | McDonald | 224/1 |
| 3,305,148 | | 2/1967 | Zimmerman | 224/5 |
| 3,307,757 | | 3/1967 | Gatos et al. | 224/5 |
| 3,326,430 | | 6/1967 | Banks | 224/5 |
| 3,326,431 | | 6/1967 | Belleni | 224/5 |
| 3,374,508 | | 3/1968 | Slimovitz | 24/3 |
| 3,507,424 | | 4/1970 | Burkins | 224/5 |
| 3,526,347 | | 9/1970 | Kuban | 224/5 |
| 3,528,720 | | 9/1970 | Treace | 350/61 |
| 3,611,444 | | 10/1971 | Rector | 2/247 |
| 3,782,614 | | 1/1974 | Campisi | 224/909 |
| 3,797,717 | | 3/1974 | Collins | 224/252 X |
| 3,884,403 | | 5/1975 | Brewer | 224/5 V |
| 3,910,470 | | 10/1975 | Swenson et al. | 224/5 V |

(List continued on next page.)

FOREIGN PATENT DOCUMENTS

| | | | |
|---|---|---|---|
| 66298 | 4/1914 | (DE) | 224/252 |

OTHER PUBLICATIONS

"Spring Clips", John F. Maguire Co., Inc., Pawtucket, R.I. Advertisement—Jun. 22, 1992.

"Snugger Camera Strap" Advertisement by Sunrise Creations—about May 1990.

"Soft Pouch" OP/TECH USA, Eagle Optics, Madison, Wisconsin Catalog & Advertisement—about 1994.

"Kuban Hitch II" Advertising—about 1990.

*Primary Examiner*—Renee S. Luebke
(74) *Attorney, Agent, or Firm*—Morriss, Bateman, O'Bryant & Compagni

(57) ABSTRACT

A restraining and protection device for the protection and the restraint of neckstrap-suspended equipment used in the field, comprising a flexible waterproof cover 10 of sufficient size to envelope most surfaces of the equipment. Attached to or part of the cover 10 is a length of elastomeric material 20 running along the edge of the cover 10. Attached to or associated with the edge of the cover are two attach tabs 40A and 40B, which enable attachment of the device 100 to the user or the user's clothing. As the restraining and protective device 100 is placed over the equipment and attached to the user or user's clothing, the elastic action of the cover 10 edge keeps the equipment protected, camouflaged, and restrained from swinging. This is accomplished by combining the actions of the elastomeric material along the cover 10 edge and the attachment means used to maintain the restraint and protection device's 100 position on the user or user's clothing.

29 Claims, 3 Drawing Sheets

U.S. PATENT DOCUMENTS

| | | | |
|---|---|---|---|
| 3,937,373 | 2/1976 | Artz | 224/26 R |
| 3,966,101 | 6/1976 | Taylor, III | 224/28 R |
| 3,982,675 | 9/1976 | Claypool . | |
| 3,990,617 | 11/1976 | Carter | 224/5 H |
| 4,033,488 | 7/1977 | Brewer | 224/5 V |
| 4,054,167 | 10/1977 | Rausch | 150/52 J |
| 4,058,242 | 11/1977 | Brewer | 224/5 V |
| 4,069,955 | 1/1978 | Noyes | 224/5 H |
| 4,071,066 | 1/1978 | Schaffer | 150/52 J |
| 4,135,653 | 1/1979 | Sieloff | 224/5 H |
| 4,135,726 | 1/1979 | Lee | 150/52 J |
| 4,148,422 | 4/1979 | Habler | 224/5 R |
| 4,168,022 | 9/1979 | Brewer | 224/257 |
| 4,232,808 | 11/1980 | Gray | 224/205 |
| 4,266,300 | 5/1981 | Partridge | 2/247 |
| 4,349,139 | 9/1982 | Oishi | 224/257 |
| 4,416,405 | 11/1983 | Caillouet | 224/257 |
| 4,421,150 | 12/1983 | Masters | 383/61 |
| 4,461,411 | 7/1984 | Harrow | 224/208 |
| 4,500,019 | 2/1985 | Curley, Jr. | 224/242 X |
| 4,556,159 | 12/1985 | Swain | 224/257 |
| 4,705,086 | 11/1987 | O'Neill | 150/134 |
| 4,751,950 | 6/1988 | Bock | 150/52 J |
| 4,865,191 | 9/1989 | Easter | 206/315.3 |
| 4,898,311 | 2/1990 | Boyer | 224/257 |
| 4,923,060 | 5/1990 | Breslau | 206/316.2 |
| 4,924,557 | 5/1990 | Heckerman et al. | 24/16 PR |
| 5,016,797 | 5/1991 | Rowledge | 224/257 |
| 5,065,919 | 11/1991 | Sims | 224/257 |
| 5,114,061 | 5/1992 | Brady | 224/252 |
| 5,172,838 | 12/1992 | Rowell et al. | 224/224 |
| 5,263,838 | 11/1993 | Meuser et al. | 224/191 |
| 5,369,148 | 11/1994 | Lucot | 224/257 |
| 5,398,855 | 3/1995 | Schaiewitz | 224/257 |

* cited by examiner

RESTRAINING AND PROTECTION DEVICE FOR NECKSTRAP-SUSPENDED EQUIPMENT

Matter enclosed in heavy brackets [ ] appears in the original patent but forms no part of this reissue specification; matter printed in italics indicates the additions made by reissue.

BACKGROUND—FIELD OF INVENTION

This invention relates to the protection and restraint of neckstrap-suspended equipment, specifically to an improved method for protecting, and restraining the swinging motion of many different types of equipment such as binoculars, cameras, compasses, or wild game cells.

BACKGROUND—DESCRIPTION OF PRIOR ART

There are many different types of protection and restraining devices available for use with neckstrap-suspended equipment. Some were developed to keep neckstrap-suspended equipment from swinging. Others were developed to only protect the suspended equipment. And still others have been invented which protect and restrain specific types of equipment. The problem with them is that some are too complicated, others too product specific, and most do not provide adequate protection and restraint during equipment use. For example, U.S. Pat. No. 3,782,614 to Campisi works well for binoculars but will not work for some types of cameras or other types of equipment and requires the manufacture of a whole separate piece of clothing. U.S. Pat. No. 4,556,159 to Swain is also too product oriented in that the lens cover portion is unable to fit a wide variety of binocular sizes. In addition, this invention doesn't protect all of the lenses and the binocular body from damage. Other inventions, such as U.S. Pat. No. 4,232,808 to Gray and U.S. Pat. No. 4,865,191 to Easter, protect the neckstrap-suspended equipment but fail to restrain the equipment from swinging, a major disadvantage for use while hiking, climbing, hunting, skiing, horseback riding or any number of other sports requiring physical activity.

OBJECTS AND ADVANTAGES

Accordingly, several advantages and objects of my restraining and protective device are as follows. My device is very inexpensive to manufacture, non-product specific, and can be made out of a wide variety of materials. Not only is my device extremely easy to use, but it can be used while doing many activities. My device works well with many different types of clothing, is very quiet to use, and is easily stowed away when not in use. It is lightweight, and provides neckstrap-suspended equipment protection from rain, dust, and damage due to banging. The object of my device is to provide a simple, inexpensive, and easy to use method to keep neckstrap-suspended equipment from swinging and at the same time provide adequate protection.

Further objects and advantages of my invention will become apparent from a consideration of the drawings and ensuing description.

DRAWING FIGURES.

| | | | |
|---|---|---|---|
| 10 | cover | 20 | elastomeric material |
| 30A | clip | 30B | clip |
| 30C | clip snap | 30D | clip snap |
| 40A | attach tab | 40B | attach tab |
| 50A | tie tack hole | 50B | tie tack hole |
| 60 | binocular neckstrap | 70A | accessory slot |
| 70B | accessory slot | 80 | binoculars |
| 90 | flexible strap | 90A | strap snap |
| 100 | front view of restraint and protection device with binoculars | 100A | Rear view of restraint restraint and protection device with binoculars |
| 100B | rear view of restraint and protection device | | |

DESCRIPTION OF THE INVENTION

Figure 1:
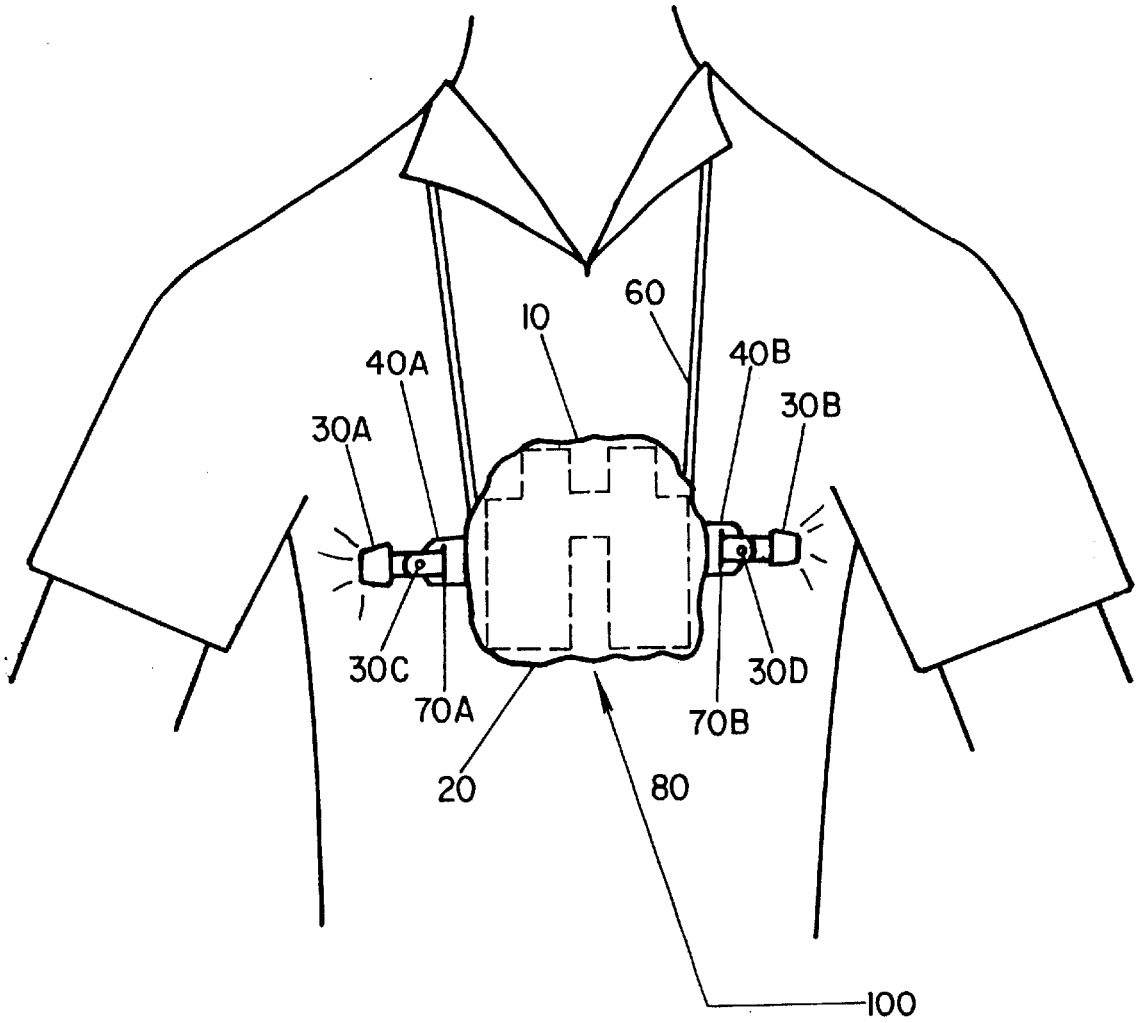
FIG. 1 is a pictorial front view of my invention showing it in use to protect and restrain a pair of binoculars.

FIG. 1 shows a front view of a basic version of my restraining and protective device 100 in use with a pair of neckstrap-suspended binoculars 80. A cover 10 consists of a single expanse of flexible material, preferably also being stretchable and water proof. However, any material having properties which produce a flexible water resistant cover could be used.

Figure 2:
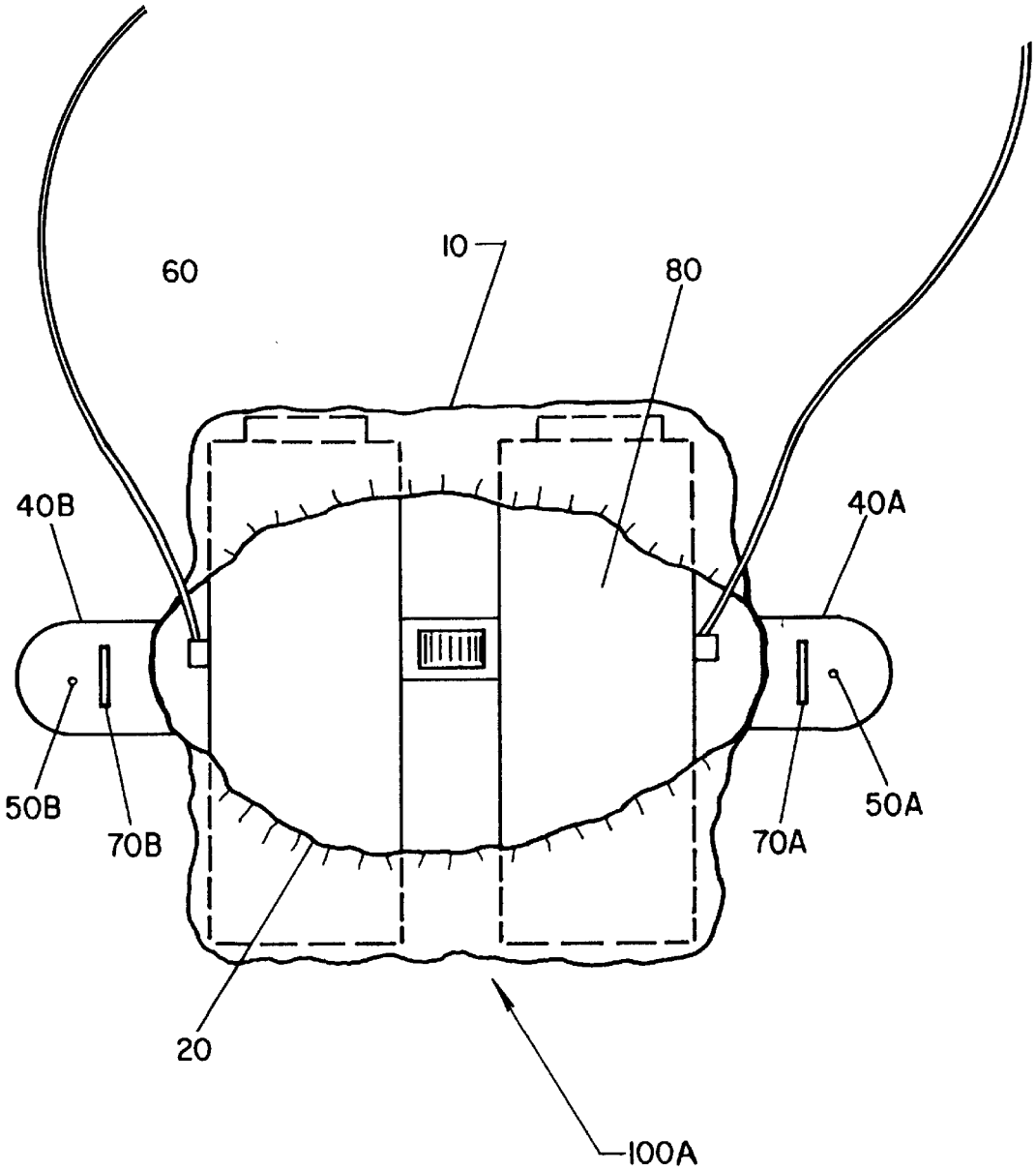
FIG. 2 is a pictorial rear view showing the side of my invention which goes against the user and the elastic action used to keep it in place on a pair of binoculars.
Figure 3:
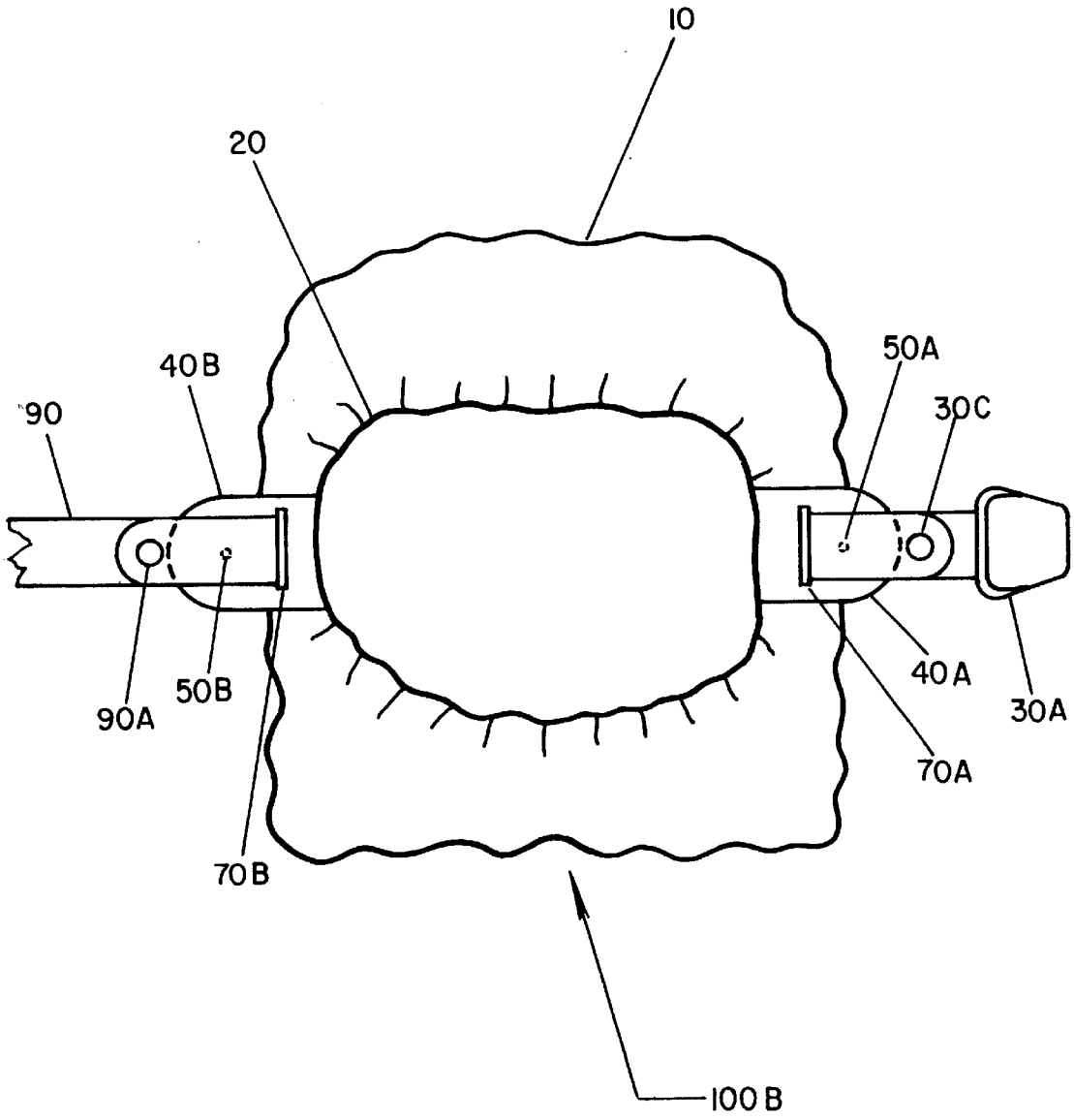
FIG. 3 shows a pictorial rear view of my invention and a few of the various methods used to hold it in position on the user.

In FIG. 3 a rear view of my device 100B shows a elastomeric material 20 which is sewn directly to the outer extremities of the cover 10, fed through a casing, or otherwise attached to the outer extremities of the cover 10 to form an expandable opening. The relaxed length of the elastomeric material 20 is less than the relaxed length of the cover 10 edge. A gathering or puckering of the cover 10 edge occurs when the elastomeric material 20 is attached. The cover 10 size, and the length of the elastomeric material 20 attached to the cover 10 is of sufficient size and length to allow for the covering of approximately 98% of all neckstrap-suspended equipment surfaces not facing the user, in this case a pair of binoculars as shown in FIGS. 1 and 2.

Approximately 60% of the binocular surfaces shown in FIG. 2 which go against the user are not covered. Attach tabs 40A and 40B shown in FIG. 1, 2, and 3 are made of any suitable material of sufficient strength and size to accomplish a means for maintaining positional location of the device 100 and binoculars 80 on the user or user's clothing. The attach tabs 40A and 40B are sewn or otherwise attached directly to the cover, or they may be an integral part of the elastomeric material 20 enclosed in a casing along the outer extremities of the cover 10, except where the tabs 40A, 40B would protrude from the casing. FIG. 3 shows two attach tabs 40A, 40B which include different means used for maintaining positional location of the restraining and protective device 100B on the user or user's clothing. A slit 70A and 70B provides for the attachment of a stretchable strap 90 or a clip 30A and 30B which is fed through the slits 70A or 70B and held in position by a snap 90A, 30C, or 30D. Also a tie tack hole 50A and 50B is provided in each attach tab 40A or 40B to allow for the use of various tie tack type of attachment means. To one skilled in the art it is easy to see that many different means for maintaining positional location of the device 100B can be used in place of the previously described attach tabs 40A and 40B. For example, loops may be sewn in place of the attach tabs to provide for the attachment of clips 30A and 30B or a strap 90. Also the cover 10 material could be cut to such a form as to provide tabs which are part of the cover 10.

OPERATION OF INVENTION

From the above description it becomes apparent how simple my restraining and protective device 100 is to use in the field. To use my device the user merely stretches the elastomeric material 20 and the cover 10 to a size sufficient to allow the positioning of the device 100 over the piece of equipment to be restrained and protected. For example, a pair of neckstrap-suspended binoculars 80 is protected and restrained from movement by first stretching the lower portion of the cover 10 and elastomeric material 20 around and over the lower portion of the suspended binoculars 80 which covers the lenses facing down. Next the upper portion of the cover 10 and elastomeric material 20 is stretched up, over, and around the upper portion of the suspended binoculars covering the lenses facing up.

Due to the elastomeric action of the cover 10 and the elastomeric material 20 attached to the cover edge, the device 100 is kept in position to cover nearly all outward facing surfaces of the binoculars 80, as is shown in FIG. 1. The only surfaces of the binoculars 80 not covered are those which go against the user and small areas near the neckstrap 60 attach points as seen in the rear view of the device 100A shown in FIG. 2. It should be noted here that the neckstrap 60 attached to the binoculars 80 is easily accommodated by the device 100A because the elastic action of the cover 10 and elastomeric material 20 simply allows the cover 10 edge to stretch over and around the attach points. After the device 100A has been positioned over the equipment, it is then held in position on the user by means of the attach tabs 40A and 40B, in combination with any of the following parts and methods as shown in FIG. 3. Tie tacks can be positioned through the tie tack holes 50A and 50B and through the user's clothing or clips 30A and 30B can fed through slits 70A and 70B and held in place by snaps 30C and 30D thus enabling the device 100 to maintain position by clipping to the user's clothing as shown in FIG. 1. A strap 90 can be fed through one of the slits 70A or 70B and held in place by the strap snap 30D, with the free end being extended around the user's body and held in position by a clip 30A or 30B on the opposite side of the device 100B. With the device thus kept in position on the user and at the same time covering the equipment, in this case a pair of binoculars, the device 100 provides protection and at the same time restricts the movement of the equipment it covers. To remove the equipment from the device 100 while the device 100 is attached to the user or user's clothing, the user needs only to lift upward on the upper edge of the cover 10 and slip the upper portion of the cover 10 up and over the top portion of the equipment. Then by lifting the neckstrap-suspended equipment out from behind the device 100, the equipment is totally freed for use.

The attachment of the device 100 to the user or user's clothing aids in preventing the loss of the device 100 and also maintains the location of the device 100 for quick placement of the device 100 over the neckstrap-suspended equipment being carried in the field.

To place the equipment being used back into the device 100 while the device 100 is still attached to the user or user's clothing, the user needs only to slide the equipment between the user and behind the device 100. Then the lower portion of the device 100 is positioned over the lower portion of the equipment and the upper portion of the device 100 is positioned over the upper portion of the equipment, providing protection and restraint as is shown in FIG. 1.

My device is very simple to use and yet very adequate for providing protection and restraining the swinging motion of equipment. It is also quiet and quick to use when at a moment's notice the equipment is needed for use. An added benefit of my device 100 is its ability to camouflage. Often neckstrap-suspended equipment swings freely during use and exposes shiny surfaces which create reflected flashes of light. These reflections often brighten wildlife being hunted or photographed.

The reader can see that my device 100 is highly versatile, lightweight, and easy to use. My device 100 is surprising in its simplicity and the synergistic results achieved while it protects, restrains, and camouflages neckstrap-suspended equipment. For example, as the equipment tries to swing due to the activities of the user, the attachment means, while being attached to the user or user's clothing, actually causes the cover to become more secure on the equipment. This action in turn aids in the restraining action of the device 100.

While the above description contains many specificities, these should not be construed as limitations on the scope of the invention, but rather as an exemplification of one preferred embodiment thereof. Many other variations are possible. For example, my restraining and protective device could be made in one piece by forming or molding elastomeric, stretchable, waterproof materials into a one piece stretchable cover with attaching means built in. Accordingly, the scope of my invention should be determined not only by the embodiment described and illustrated. but also by the appended claims and their legal equivalents.

I claim:

[1. A restraining and protection device adapted to restrain and protect equipment suspended by a flexible length of material completely and unbrokenly looped around the user's neck and acting as a neckstrap, the equipment being held in a non-swinging covered manner, in front of a user comprising:

(a) a covering made of flexible and stretchable material employing at an outer extremity of said covering, elastomeric material which is different than the covering, the elastomeric material stretching and contracting along its length and (b) means for maintaining positional location of said covering on the user or user's clothing and (c) said covering being of suitable size to provide restraint and protection of neckstrap-suspended equipment by means of an elastomeric and stretching action of said elastomeric material attached to the covering in combination with said means for maintaining positional location, thereby keeping said covering over said equipment and substantially restraining any significant swinging motion of said equipment.]

2. An apparatus for restraining and protecting [neckstrap-suspended] *user* equipment *in combination with said user equipment, said user equipment including at least a first attachment point and a neckstrap connected to at least the first attachment point, the neckstrap providing a continuous loop from the first attachment point, around a neck of a user and back to the user equipment, such that the user equipment can be suspended from the neckstrap and such that the user equipment can be suspended in a free-swinging manner, the user also having shoulders and legs*, the apparatus *for restraining and protecting user equipment in combination with said user equipment* comprising:

covering means for encasing *at least* a portion of the *user* equipment, the covering means being flexible and conformable to the shape of the equipment, the covering means having an extremity portion;

[elastomeric] means for [biasing] *allowing* the extremity of the covering means [toward itself] *to stretch to a first*

*length and also retract to a second length, the second length being less than the first length* so that [the extremity of] the covering means [gathers toward itself and] forms a [pocket] *structure* capable of receiving the *user* equipment; and means for maintaining positional location of the covering means on [a] *the* user as the *user* equipment hangs from the user by the neckstrap [and as the], *the means for maintaining positional location comprising:*

*at least a first connection means on the covering means; and*

*flexible strap means for encircling the user's body, the flexible strap means connected to the first connection means on the covering means, the flexible strap means and the covering means together having a length sufficient to encircle the user's body at a location below the user's neck and above the user's legs without encircling either of the user's shoulders such that the user* equipment is held within the [pocket] *structure* formed by the covering means such that the user can readily remove the equipment from the [pocket] *structure* formed in the covering means to use the equipment and such that the user can readily insert the equipment into the [pocket] *structure* formed by the covering means such that at least a substantial portion of the equipment is covered by the covering means and any swinging motion of the equipment is at least partially restrained.

3. An apparatus for restraining and protecting neckstrap-suspended equipment as defined in claim 2 wherein the equipment comprises binoculars.

4. An apparatus for restraining and protecting neckstrap-suspended equipment as defined in claim 2 wherein the covering means comprises a substantially water resistant material.

5. An apparatus for restraining and protecting neckstrap-suspended equipment as defined in claim 2 wherein the covering means completely covers at least one side of the equipment.

6. An apparatus for restraining and protecting neckstrap-suspended equipment as defined in claim 2 wherein the *strap* means [for maintaining positional location] comprises a *first* strap *and a second strap.*

7. An apparatus for restraining and protecting neckstrap-suspended equipment as defined in claim 6 wherein the [strap comprises] *straps comprise* a stretchable material.

8. An apparatus for restraining and protecting neckstrap-suspended equipment as defined in claim 2 wherein the means for maintaining positional location comprises [clips] *a clip* connected to the covering means, the [clips] *clip* being adapted to clip to the user's clothing.

9. An apparatus for restraining and protecting neckstrap-suspended equipment as defined in claim 2 wherein the means for maintaining positional location comprises at least one tie tack hole.

10. An apparatus for restraining and protecting neckstrap-suspended equipment as defined in claim 2 wherein the covering means comprises a single piece of material.

11. An apparatus for restraining and protecting neckstrap-suspended equipment as defined in claim 2 wherein the [elastomeric] means *for allowing* comprises a material which is different than the covering means and is provided adjacent to and about at least a portion of the extremity of the covering means.

12. An apparatus for restraining and protecting neckstrap-suspended equipment as defined in claim 2 wherein the [elastomeric] means *for allowing* comprises a material which is the same as the covering means and is integral with the covering means.

13. An apparatus for restraining and protecting neckstrap-suspended equipment as defined in claim 12 wherein the covering means and the [elastomeric] means *for allowing* comprises a stretchable and water proof material.

14. An apparatus for restraining and protecting neckstrap-suspended equipment as defined in claim 2 wherein the covering means comprises a means for camouflaging.

15. An apparatus for restraining and protecting neckstrap-suspended equipment as defined in claim 2 wherein the covering means comprises a stretchable material.

16. An apparatus for restraining and protecting binoculars which are hanging from a user's body by a neckstrap, the apparatus comprising:

covering means for encasing at least a portion of the binoculars which is facing away from the user's body when hanging by the neckstrap, the covering means being flexible and conformable to the shape of the binoculars, the covering means having an extremity portion;

elastomeric means, provided adjacent to and about substantially all of the extremity of the covering means, for biasing the extremity of the covering means toward itself so that the extremity of the covering means gathers toward itself and forms a pocket capable of receiving and holding the binoculars, the elastomeric means comprising a material which is different than the covering means and which is attached to the covering means; and means for maintaining positional location of the covering means on a chest of the user as the binoculars hang from the user by the neckstrap and as the binoculars are held within the pocket formed by the covering means, *the means for maintaining positional location comprises clips connected to the covering means, the clips being adapted to clip to the user's clothing and* such that the user can readily remove the binoculars from the pocket formed in the covering means to bring the binoculars up to an eye of the user and such that the user can readily again insert the binoculars into the pocket formed by the covering means such that at least a [the] portion of the binoculars which faces away from the user's body when suspended by the neckstrap is covered by the covering means and protected from ambient precipitation and any swinging motion of the binoculars as the user moves is at least partially restrained.

17. An apparatus for restraining and protecting binoculars hanging from a portion of a user's body by a neckstrap as defined in claim 16 wherein the covering means comprises a substantially water resistant material.

18. An apparatus for restraining and protecting binoculars hanging from a portion of a user's body by a neckstrap as defined in claim 16 wherein the means for maintaining positional location comprises a strap.

[19. An apparatus for restraining and protecting binoculars hanging from a portion of a user's body by a neckstrap as defined in claim 16 wherein the means for maintaining positional location comprises clips connected to the covering means, the clips being adapted to clip to the user's clothing.]

*20. An apparatus for restraining and protecting user equipment in combination with said user equipment, said user equipment including at least a first attachment point and a neckstrap connected to at least the first attachment point, the neckstrap providing a continuous loop from the*

*first attachment point, around a neck of a user and back to the user equipment, such that the user equipment can be suspended from the neckstrap and such that the user equipment can be suspended in a free-swinging manner, the user also having a torso, a waist, shoulders and legs, the apparatus for restraining and protecting user equipment in combination with said user equipment comprising:*

*covering means for encasing at least a portion of the user equipment, the covering means being flexible and conformable to the shape of the equipment, the covering means having an extremity portion;*

*means for allowing the extremity of the covering means to stretch to a first length and also retract to a second length, the second length being less than the first length so that the covering means forms a structure capable of receiving the user equipment; and*

*means for maintaining positional location of the covering means on the user as the user equipment hangs from the user by the neckstrap such that the user equipment can be completely removed from the covering means with no connection therebetween during use of the equipment, the means for maintaining positional location comprising:*

*at least a first connection means connected to the covering means; and*

*a flexible strap connected to the first connection means on the covering means, the flexible strap and the covering means together having a length sufficient to encircle the user's torso at a location below the user's neck and the above the user's waist such that the user equipment is held within the structure formed by the covering means such that the user can readily remove the equipment from the structure formed in the covering means to use the equipment and such that the user can readily insert the equipment into the structure formed by the covering means such that at least a substantial portion of the equipment is covered by the covering means and any swinging motion of the equipment is at least partially restrained, the flexible strap not having any connection to any attachment point on the user equipment.*

*21. An apparatus for restraining and protecting neckstrap-suspended equipment as defined in claim 20 wherein the user equipment comprises binoculars.*

*22. An apparatus for restraining and protecting neckstrap-suspended equipment as defined in claim 20 wherein the covering means comprises a substantially water resistant material.*

*23. An apparatus for restraining and protecting neckstrap-suspended equipment as defined in claim 20 wherein the covering means completely covers at least one side of the user equipment.*

*24. An apparatus for restraining and protecting neckstrap-suspended equipment as defined in claim 20 wherein the flexible strap comprises a stretchable material.*

*25. An apparatus for restraining and protecting neckstrap-suspended equipment as defined in claim 20 wherein the means for maintaining positional location comprises a clip, the clip being connected to the connection means on the covering means, the clip being adapted for clipping to the user's clothing.*

*26. An apparatus for restraining and protecting neckstrap-suspended equipment as defined in claim 20 wherein the covering means comprises a single piece of material.*

*27. An apparatus for restraining and protecting neckstrap-suspended equipment as defined in claim 20 wherein the means for allowing comprises a material which is different than the covering means and is provided adjacent to and about at least a portion of the extremity of the covering means.*

*28. An apparatus for restraining and protecting neckstrap-suspended equipment as defined in claim 20 wherein the means for allowing comprises a material which is the same as the covering means and is integral with the covering means.*

*29. An apparatus for restraining and protecting neckstrap-suspended equipment as defined in claim 20 wherein the covering means and the means for allowing comprises a stretchable and water proof material.*

*30. An apparatus for restraining and protecting neckstrap-suspended equipment as defined in claim 20 wherein the covering means is provided with a camouflage pattern.*

*31. An apparatus for restraining and protecting neckstrap-suspended equipment as defined in claim 20 wherein the covering means comprises a stretchable material.*

* * * * *